United States Patent [19]

Napoli et al.

[11] 3,792,385

[45] Feb. 12, 1974

[54] COAXIAL MAGNETIC SLUG TUNER

[75] Inventors: Louis Sebastian Napoli, Trenton; John Joseph Hughes, Spotswood, both of N.J.

[73] Assignee: RCA Corporation, New York, N.Y.

[22] Filed: Nov. 6, 1972

[21] Appl. No.: 303,798

[52] U.S. Cl. .................................. 333/97 R, 333/33

[51] Int. Cl. ........................... H01p 1/00, H01p 5/04

[58] Field of Search ........................ 333/33, 96, 97 R

[56] References Cited

UNITED STATES PATENTS 2,403,252 7/1946 Wheeler ............................ 333/97 R 3,386,054 5/1968 Spikula ................................ 333/33

FOREIGN PATENTS OR APPLICATIONS 784,018 10/1957 Great Britain ........................ 333/33

*Primary Examiner*—James W. Lawrence
*Assistant Examiner*—Wm. H. Punter
*Attorney, Agent, or Firm*—Edward J. Norton; Joseph D. Lazar; Donald E. Mahoney

[57] ABSTRACT

A movable magnetic tuning slug capacitively coupled to both the center conductor and outer conductor of an electromagnetic transmission line is used to provide a desired transmission line impedance in response to an applied magnetic field.

4 Claims, 2 Drawing Figures

COAXIAL MAGNETIC SLUG TUNER

DESCRIPTION OF THE PRIOR ART

Coaxial slug tuners are well known in the prior art as devices capable of introducing a desired transmission line impedance and resulting reflection coefficient to a coaxial transmission line having an outer tube-like conductor and an internal center conductor. Usually two tuning slugs are slidably mounted inside a coaxial transmission line and moved in a longitudinal direction along the transmission line between the center and outer conductors. The reflection coefficients introduced by the tuning slugs combine to establish a voltage standing wave ratio (VSWR) along the coaxial transmission line. The magnitude of the VSWR is dependent on the electrical separation between the two tuning slugs. A prior art coaxial tuning slug consisted of a metallic ring surrounding a dielectric ring having an axis concentric with the metallic ring and center conductor axes. The prior art metallic ring is in electrical contact with the outer conductor and the prior art dielectric ring electrically isolates the metallic ring from the center conductor. The magnitude of the transmission line impedance introduced by a tuning slug is dependent on the tuning slugs physical dimensions and the magnitude of the dielectric constant of the dielectric ring. The tuning slugs are moved by applying force in a longitudinal direction to one end of pins extending through a longitudinal slot in the outer conductor wall. The other end of the pins are connected to the tuning slug metallic ring.

Some of the problems of the prior art slug tuners are that some electromagnetic energy coupled to the coaxial transmission line radiates through the slot in the outer conductor wall. Also, the operating frequency of the prior art slug tuners is limited to being below that frequency where the inner circumference of the outer conductor approaches λ/2, where λ is the wavelength at the operating frequency.

SUMMARY OF THE INVENTION

A magnetic tuning slug is located inside an electromagnetic energy transmission line having an outer tube-like conductor insulated from an internal center conductor with a longitudinal axis parallel to the longitudinal axis of the outer conductor. The magnetic tuning slug is capacitively coupled to both the center and outer conductors and is slidably movable along the center conductor in response to a magnetic field external to the outer conductor.

DESCRIPTION OF THE EMBODIMENT

Figure 1:
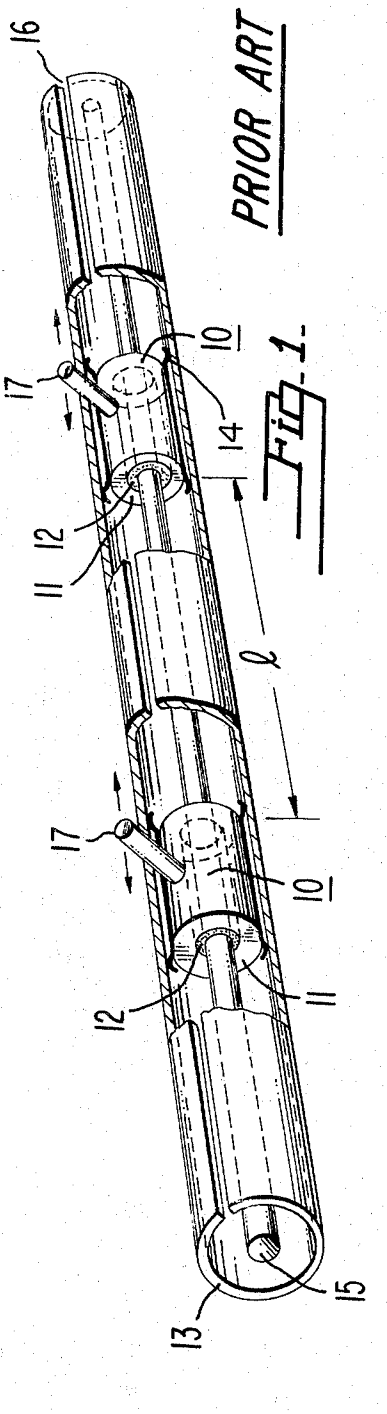
FIG. 1 is a perspective view, partially broken away into section, of a prior art double slug tuner.

Referring to FIG. 1, there is shown a drawing of one example of a prior art coaxial double slug tuner. Each of the identical movable tuning slugs 10 are internally mounted within an air dielectric coaxial transmission line suitable for transmitting electromagnetic energy. Tuning slugs 10 comprise an outer metallic ring 11 surrounding an inner dielectric ring 12. Outer metallic ring 11 is in electrical contact with the coaxial transmission line outer conductor 13 via metallic contact finger 14. Inner dielectric ring 12 surrounds the coaxial transmission line center conductor 15 and prevents electrical contact between outer metallic ring 11 and center conductor 15.

Outer conductor 13 of the coaxial transmission line has a longitudinal slot 16 extending over its entire length. Slot 16 is parallel to center conductor 15. Tuning slugs 10 are made to slide over center conductor 15 and between outer conductor 13 by applying force, in a direction parallel to center conductor 15, to the ends of rods 17 protruding from slot 16. The other ends of rods 17 are connected to tuning slugs 10.

It is well known in the prior art that at microwave frequencies each tuning slug 10 is electrically equivalent to a capacitor connected between center conductor 15 and outer conductor 13. The magnitude of the capacitive reactance is proportional to the operating frequency, the electrical length of tuning slug 10 and the characteristic impedance of the transmission line section formed by outer metallic ring 11 and center conductor 15. Thus, each tuning slug 10 introduces an impedance and a resulting reflection coefficient to the coaxial transmission line. The reflection coefficients introduced by each tuning slug 10 combine to establish a resultant voltage standing wave ratio (VSWR). The magnitude of the VSWR is dependent on the electrical length, $l$, between tuning slugs 10. Therefore, by changing the electrical length, $l$, between tuning slugs 10, the magnitude of the resultant VSWR is made variable. The phase of the resulting reflection coefficient, with respect to a selected double slug tuner end (input or output), is dependent on the electrical length between the selected end and the location along the coaxial transmission line of the combined impedance introduced by tuning slugs 10. It is not easy to predict exactly where along the coaxial transmission line the combined impedance is physically located. However, if both tunings slugs 10 are moved relative to a selected double slug tuner end (input or output), while maintaining the electrical length, $l$, between tuning slugs 10, the phase of the resulting reflection coefficient is made variable. Thus, tuning slugs 10 provide a resulting reflection coefficient having a variable magnitude dependent on the electrical length, $l$, between slug tuners 10 and a variable phase that is dependent on the physical location of slug tuners 10 relative to a selected double slug tuner end (input or output).

The prior art double slug tuner radiates some electromagnetic energy from the slot in the outer conductor wall. When the radiated energy is substantial, the prior art double slug tuners use a polyiron choke to minimize this undesirable effect. The slot in the outer conductor of a coaxial transmission line lowers the frequency at which electromagnetic energy is propagated in an undesired mode in the slug tuner. A slotted coaxial transmission line propagates an input microwave signal in an undesired transmission mode when the inner circumference of outer conductor 13 approaches an electrical length of λ/2, where λ is the wavelength at the frequency of the input signal. A coaxial transmission line without a longitudinal slot in its outer conductor propagates an input microwave signal in an undesired transmission mode when the inner circumference of its outer conductor approaches an electrical length of λ, where λ is the wavelength at the frequency of the input microwave signal. Thus, a coaxial transmission line without a slot in its outer conductor will operate at twice the frequency of a slotted coaxial transmission line without propagating energy in an unwanted mode. It is also obvious that without a slot, the outer conductor of a coaxial transmission line is prevented from radiating electromagnetic energy.

Figure 2:
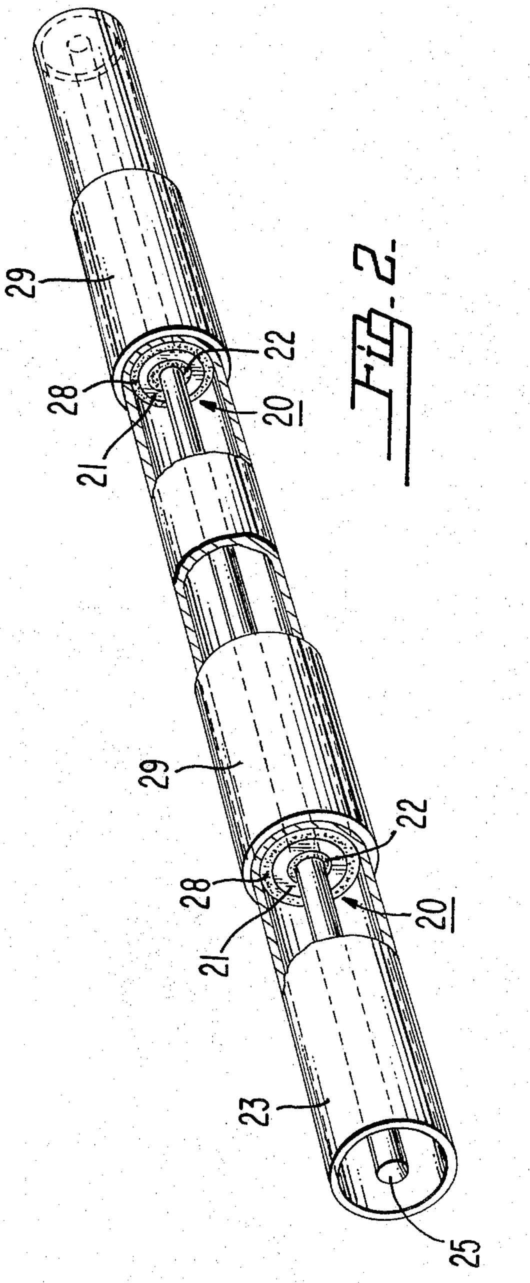
FIG. 2 is a perspective view, partially broken away into section, of a coaxial double magnetic slug tuner.

Referring to FIG. 2, there is shown a drawing of an improved coaxial double magnetic slug tuner. The improved coaxial double magnetic slug tuner eliminates all of the previously mentioned limitations associated with the prior art slotted coaxial line double slug tuners. Each of the identical movable tuning slugs 20 are internally mounted within an air dielectric coaxial transmission line. Tuning slugs 20 each have an outer dielectric ring 28 surrounding a concentric magnetic ring 21 which in turn surrounds an inner dielectric ring 22 concentric with magnetic ring 21 and center conductor 25. Inner dielectric ring 22 surrounds the coaxial transmission line center conductor 25 and prevents electrical contact between magnetic ring 21 and center conductor 25. Outer dielectric ring 28 isolates magnetic ring 21 from outer conductor 23 of the coaxial transmission line. Tuning slugs 20 are illustrated in FIG. 2 as an arrangement of concentric dielectric and magnetic closed rings 28, 22 and 21. This is only one example of tuning slug configuration. There may be circumstances where the closed ring configuration of tuning slug 20 design may not be desired. For example, a section may be cut from tuning slug 20 to permit the movement of tuning slug 20 over an obstruction connected from center conductor 25 to outer conductor 23.

Tuning slug 20 is electrically equivalent, at microwave frequencies, to a series connection of first and second coaxial capacitors. The first coaxial capacitor is connected between outer conductor 23 and magnetic ring 21. The magnitude of the first coaxial capacitor is substantially dependent on the dielectric constant of outer dielectric ring 28, the inner diameter of outer conductor 23, the outer diameter of magnetic ring 21 and the length of slug tuner 20. The second coaxial capacitor is connected between magnetic ring 21 and center conductor 25. The magnitude of the second coaxial capacitor is substantially dependent on the dielectric constant of inner dielectric ring 22, the inner diameter of magnetic ring 21, the diameter of center conductor 25 and the length of tuning slug 20. The inner and outer dielectric rings 22 and 28 also provide a good surface for sliding tuning slugs 20 against the metallic surfaces of the coaxial transmission line. This improvement eliminates electrical "noise" or output signal jitter resulting from moving contact fingers 14 of prior art tuning slugs 10 against outer conductor 13 (FIG. 1).

Tuning slugs 20 are made to slide over center conductor 25 and between outer conductor 23 by moving magnets 29 located on the outer surface of outer conductor 23. As an example, magnets 29 may be in the form of a ring designed to slide over the external wall of outer conductor 23. The magnetic attraction between magnets 29 and magnetic rings 21 of tuning slugs 20 permit a sliding movement of magnet 29 to be followed by a corresponding sliding movement of tuning slug 20. Magnets 29 are placed over tuning slugs 20 with like magnetic poles facing each other to prevent a magnetic attraction between magnets 29. Likewise, the magnetic rings 21 of tunings slugs 20 are positioned on center conductor 25 with like magnetic poles facing each other to prevent a magnetic attraction between tuning slugs 20.

Polytetrafluoroethylene, or Teflon, having a dielectic constant of 2.1 is used in the construction of inner and outer dielectric rings 22 and 28. A gold plated metallic composition of aluminum, nickel and cobalt or alnico is used in the construction of magnetic rings 21. The resulting VSWR of the improved coaxial double magnetic slug tuner is variable over the range between 1:1 to 15:1.

A preferred embodiment of the invention has been shown and described. Various other embodiments and modifications thereof will be apparent to those skilled in the art. For example, while the preferred embodiment is in the form of a double magnetic slug coaxial transmission line tuner, the disclosed invention concept can be used in the construction of a single magnetic slug coaxial transmission line tuner. The magnets in FIG. 2 are in the form of a closed ring encircling outer conductor 23. The magnets could also be any magnet employed to move tuning slugs 20 to an empiracally determined position. Once tuning slugs 20 are in position, the magnets could be removed and tuning slugs 20 could be locked in position by a dielectric rod extending from outer conductor 23 to center conductor 25 through tuning slugs 20.

The disclosed concept of a magnetic slug tuner need not be limited to applications in a coaxial transmission line. The magnetic slug tuner can be successfully used in other electromagnetic transmission lines having a tube-like outer conductor and a center conductor such as trough guide or eccentric transmission line.

What is claimed is:

1. Apparatus comprising:

a transmission line for transmitting electromagnetic energy having an outer tube-like conductor insulated from a center conductor located inside said outer conductor, said outer and center conductors having parallel longitudinal axes; and at least a first magnetic tuning slug having a predetermined length located inside said outer conductor and said tuning slug length being capacitively coupled to both said outer and center conductors by separating said tuning slug length from said outer and center conductors by dielectric material having said predetermined length, said tuning slug being slidably movable along said center conductor in response to a magnetic field from a magnet, said magnet being in the form of a ring positioned external to and encircling said outer conductor, said magnet being slidably movable longitudinally along said outer conductor.

2. Apparatus according to claim 1, wherein said tuning slug comprises a first dielectric ring surrounding a concentric magnetic ring which in turn surrounds a second dielectric ring concentric with said magnetic ring and said center conductor.

3. Apparatus according to claim 1, wherein said transmission line is a coaxial transmission line.

4. A coaxial transmission line double slug tuner comprising:

a transmission having coaxial outer and center conductors, said center conductor located inside said outer conductor;

a first magnetic tuning slug located inside said outer conductor and having a first dielectric ring surrounding a concentric magnetic ring over a first predetermined length which in turn surrounds a second dielectric ring having said first predetermined length, said second dielectric ring being concentric with said magnetic ring and said center conductor, said magnetic ring being capacitively coupled to both said outer and center conductors; and a second magnetic tuning slug located inside said outer conductor and having a first dielectric ring surrounding a concentric magnetic ring over a second predetermined length which in turn surrounds a second dielectric ring having said second predetermined length, said second dielectric ring being concentric with said second tuning slug magnetic ring and said center conductor, said second tuning slug magnetic ring being capacitively coupled to both said outer and center conductors, said second and first magnetic tuning slugs being slidably movable along said center conductor in response to a magnetic field from a magnet, said magnet being in the form of a ring positioned external to and encircling said outer conductor, said magnet being slidably movable longitudinally along said outer conductor.

* * * * *